(12) United States Patent
Hobson, Jr.

(10) Patent No.: US 6,217,781 B1
(45) Date of Patent: Apr. 17, 2001

(54) APPLICATIONS FOR SLACK FILTER TUBE WITH TENSIONING MEANS

(76) Inventor: Russell B. Hobson, Jr., Rte. 3 Box 85, Mill Creek Rd., Old Fort, NC (US) 28762

(*) Notice: Subject to any disclaimer, the term of this patent is extended or adjusted under 35 U.S.C. 154(b) by 0 days.

This patent is subject to a terminal disclaimer.

(21) Appl. No.: 09/241,130

(22) Filed: Feb. 1, 1999

Related U.S. Application Data

(60) Provisional application No. 60/084,218, filed on May 5, 1998.

(51) Int. Cl.⁷ .................................................. B01D 24/00
(52) U.S. Cl. ...................... 210/777; 210/791; 210/323.2; 210/332; 210/356; 210/486; 210/495; 210/497.01; 55/379
(58) Field of Search ................................ 210/330, 323.2, 210/332, 356, 359, 383, 384, 385, 497.01, 497.1, 486, 495, 346, 352, 777, 791; 55/379, 304, 305

(56) References Cited

U.S. PATENT DOCUMENTS

| | | |
|---|---|---|
| Re. 24,136 | 4/1956 | Marvel . |
| 82,255 | 9/1868 | Simmons . |
| 673,398 | 5/1901 | Keller . |
| 707,811 | 8/1902 | Monjeau . |
| 1,040,342 | 10/1912 | Johnson . |
| 1,489,519 | 2/1924 | Chateau . |
| 1,741,705 | 12/1929 | Liddell . |
| 1,905,738 | 4/1933 | Norquist . |
| 1,928,670 * | 10/1933 | McCrery ................................ 55/300 |
| 1,935,136 | 11/1933 | Thibert . |
| 2,014,105 | 9/1935 | Dooley . |
| 2,035,758 | 3/1936 | Pierce . |
| 2,067,439 | 1/1937 | Dooley . |
| 2,145,047 | 1/1939 | Goldkamp . |
| 2,274,352 | 2/1942 | Wood . |
| 2,301,430 * | 11/1942 | Malanowski ......................... 210/778 |
| 2,475,561 | 7/1949 | Cooperider . |
| 2,480,320 | 8/1949 | Carrier . |
| 2,480,653 | 8/1949 | Hoefer, Jr. . |
| 2,570,132 | 10/1951 | Koupal . |
| 2,788,129 | 4/1957 | Thompson . |

(List continued on next page.)

FOREIGN PATENT DOCUMENTS

1310 * of 1866 (GB) .

* cited by examiner

Primary Examiner—Matthew O. Savage
Assistant Examiner—Richard W. Ward
(74) Attorney, Agent, or Firm—Weingram & Associates, P.C.

(57) ABSTRACT

Slack end filtering tubes with tensioning members are utilized in an improved bump type filter employing a split inlet with an outlet and tube sheet at the lower slack end and a movable anchor plate at the upper end that can apply an adjustable tension to the filter tubes. The lower tube sheet is angled and has varying length connections to a plurality of filters to permit use of filter tubes of equal size. Movement of the anchor plate adjusts the lengths of the tubes by extending or shrinking the tubes to provide tension or relaxation of the tubes. Shaking the relaxed tubes removes accumulated materials to be flushed out. Tensioning of the tubes provides for filtration at the tubes. Slack end filtering tubes with tensioning members are employed in another embodiment to extract filtered liquid. A first set of filters extends outwardly from a vertical wall with a second set of filters resting along the bottom of the receiver. The housing has inlet, outlet and suction openings to supply liquid and withdraw filtered liquid.

18 Claims, 2 Drawing Sheets

U.S. PATENT DOCUMENTS

| | | |
|---|---|---|
| 2,819,800 | 1/1958 | Goodloe . |
| 2,835,391 | 5/1958 | Bottum . |
| 2,934,209 | 4/1960 | Franck . |
| 3,055,290 | 9/1962 | Arvanitakis . |
| 3,065,856 | 11/1962 | Goldman . |
| 3,100,190 | 8/1963 | Hobson, Jr. . |
| 3,216,572 | 11/1965 | Kasten . |
| 3,219,072 | 11/1965 | Lau . |
| 3,279,608 | 10/1966 | Soriente . |
| 3,319,793 | 5/1967 | Miller, Jr. . |
| 3,327,864 | 6/1967 | Ball . |
| 3,362,535 | 1/1968 | Kasten . |
| 3,386,587 | 6/1968 | Mast . |
| 3,394,067 | 7/1968 | Shirley . |
| 3,394,815 | 7/1968 | Harms . |
| 3,407,572 * | 10/1968 | Tolley ................................. 55/283 |
| 3,532,220 | 10/1970 | Lewis . |
| 3,576,444 | 4/1971 | Roberts . |
| 3,578,175 | 5/1971 | Manjikian . |
| 3,601,795 | 8/1971 | Shimizu . |
| 3,609,681 | 9/1971 | Saul . |
| 3,642,141 | 2/1972 | Hobson, Jr. . |
| 3,728,676 | 4/1973 | Brown . |
| 3,868,325 | 2/1975 | Otto . |
| 3,937,281 | 2/1976 | Harnsberger . |
| 4,048,075 | 9/1977 | Colvin . |
| 4,058,464 | 11/1977 | Rogers . |
| 4,063,217 | 12/1977 | Hyde . |
| 4,094,784 | 6/1978 | Hirano . |
| 4,157,900 | 6/1979 | Margraf . |
| 4,246,114 | 1/1981 | Krebs . |
| 4,292,180 | 9/1981 | Zylka . |
| 4,340,477 | 7/1982 | Hobson, Jr. . |
| 4,422,938 | 12/1983 | Miller . |
| 4,427,547 | 1/1984 | Miller . |
| 4,439,327 | 3/1984 | Muller . |
| 4,526,688 | 7/1985 | Schmidt, Jr. . |
| 4,552,661 | 11/1985 | Morgan . |
| 4,714,557 | 12/1987 | Croket . |
| 4,783,259 | 11/1988 | Wade . |
| 4,836,922 | 6/1989 | Rishel . |
| 4,836,936 | 6/1989 | Schewitz . |
| 4,859,988 | 8/1989 | Holtvluwer . |
| 4,872,981 | 10/1989 | Hobson, Jr. . |
| 4,878,042 | 10/1989 | Eggiman . |
| 4,904,380 * | 2/1990 | Bhanot et al. ....................... 210/193 |
| 4,919,801 | 4/1990 | Hobson, Jr. . |
| 4,944,873 | 7/1990 | Williams . |
| 5,084,176 | 1/1992 | Davis . |
| 5,114,583 | 5/1992 | Concin . |
| 5,128,032 | 7/1992 | Rosaen . |
| 5,128,038 * | 7/1992 | Slavitschek et al. ............. 210/323.2 |
| 5,156,749 | 10/1992 | Williams . |
| 5,202,017 | 4/1993 | Hunter . |
| 5,221,469 | 6/1993 | Nehls . |
| 5,227,076 | 7/1993 | Bogen . |
| 5,230,131 | 7/1993 | Hobson, Jr. . |
| 5,389,913 | 2/1995 | Boser . |
| 5,407,570 | 4/1995 | Hobson, Jr. . |
| 5,426,414 | 6/1995 | Flatin . |
| 5,440,288 | 8/1995 | Gottlieb . |
| 5,441,633 | 8/1995 | Schewitz . |
| 5,445,738 | 8/1995 | Fry . |
| 5,449,468 | 9/1995 | Trummel . |
| 5,482,594 | 1/1996 | Salminen . |

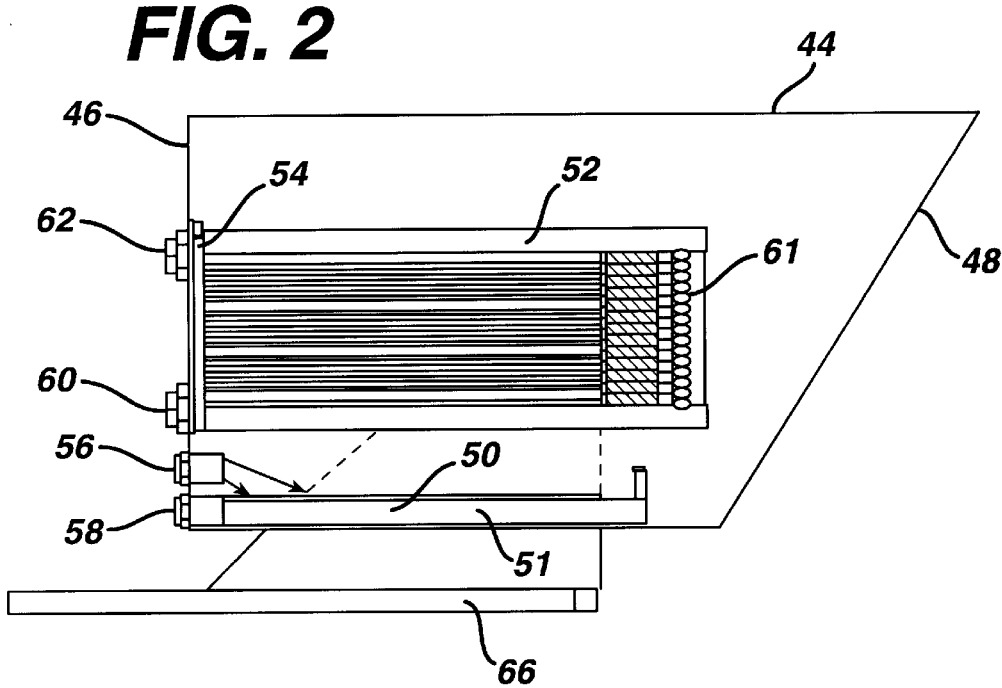
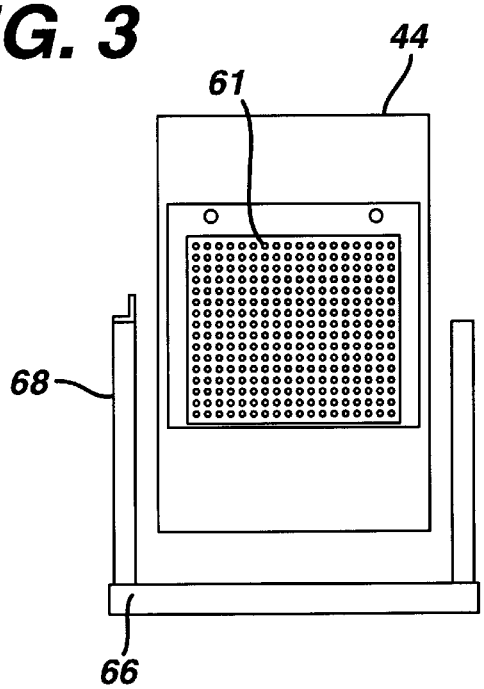
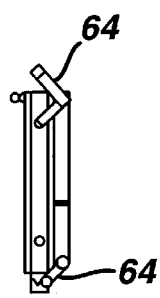

APPLICATIONS FOR SLACK FILTER TUBE WITH TENSIONING MEANS

This application claims the benefit of U.S. Provisional Application(s) No.: 60/084,218 filed May 5, 1998.

BACKGROUND OF THE INVENTION

1. Field of the Invention

This invention relates to applications of filter tubes utilizing slack filter tubes with tensioning means and particularly to embodiments having adjustable tensioning means coupled to the ends of the filters.

2. Description of Related Prior Applications

This application relates to an earlier Provisional Application Serial No. 60/084,218 filed May 5, 1998 and incorporates the subject matter of U.S. patent application Ser. No. 09/072,867 for Slack Filter Tube With Tensioning Means to Hobson, also filed May 5, 1998, now U.S. Pat. No. 6,051,138. In addition, the earlier listed patents to Hobson, as Well as U.S. Pat. Nos. 4,340,477 to Hobson et al., issued Jul. 20, 1982, and 4,872,981 to Hobson, issued Oct. 10, 1989, are also incorporated by reference herein.

DESCRIPTION OF THE PRIOR ART

Several patents relating to various systems for utilizing coated braided filter tubes having inner support springs were cited in the earlier filed U.S. patent application Ser. No. 09/072,867 (now U.S. Pat. No. 6,051,138) as follows.

U.S. Pat. No. 2,480,320 to Carrier discloses filtering apparatus supporting a plurality of filter elements at the upper and lower ends. A spring and motor at the upper end provide oscillations for removal of sludge. The upper supporting end is removable to permit removal and replacement of filters.

U.S. Pat. No. 2,570,132 to Koupal concerns apparatus for cleaning filter elements of the air-bump wash types. Loss of air is avoided by provision of a solid wall in the inlet chamber as a more suitable air storage space. The need for airtight seals is eliminated and previous impervious upper portions of the filter elements are omitted and the full length of the filters can be used with shorter elements.

U.S. Pat. No. 2,934,209 to Franck describes a fluid dehydrator with improved filtering. The fluid to be dehydrated is passed through a shell filled with a desiccant which can be contaminated by oil in the fluid. A strainer is employed at the inlet to strain out particulate material before passing through the desiccant. A second filter at the outlet provides further filtering of the fluid passing into a second desiccant chamber.

U.S. Pat. No. 4,094,784 to Hirano discloses apparatus for filtering, dehydrating and drying suspension material. A filter mesh is supported on a rotatable valve plate in a vertical cylinder. The mesh collects a cake which is dried, vibrated and dropped through a lower opening by tilting the plate.

U.S. Pat. Nos. 4,422,938 to Miller and 4,427,547 to Miller concern a backwashing filter apparatus which utilizes an inner tapered housing to provide an annular outer flow passage that decreases from inlet to outlet. This provides a uniform liquid velocity through the filter in both forward and back flow operation. A grid support for the inner filter is formed of a plurality of ring-like segments stacked end to end.

U.S. Pat. No. 4,522,661 to Morgan describes a liquid filter device having replaceable self-retaining filtering bags which are formed to snap fit into a groove within the upper portion of the filter housing.

As described in U.S. patent application Ser. No. 09/072, 867 (now U.S. Pat. No. 6,051,138) prior filter tube systems had difficulty in removing contaminated filtering coats and left residues which could produce later contamination during the filtering cycle. The use of slack filter tubes with tensioning means has largely alleviated this problem. A movable anchor plate applies controlled levels of tension to the filter tubes during the filtering operation and relaxation of tension during agitation or shaking of the filter tubes to remove accumulated particulate matter. The use of slack filter tubes in various embodiments provides improved results.

OBJECTS AND SUMMARY OF THE INVENTION

It is therefore the primary object of the present invention to provide improved filtering systems and methods employing slack end filtering tubes with tensioning means;

It is a further object of the present invention to provide slack end filter tubes having adjustable tensioning means;

It is still another object of the present invention to provide an improved bump type filter having an outlet and tube sheet at the lower slack end and a movable anchor late at the upper end;

It is also an object of the invention to provide a slack end filter tube having an angled tube sheet having connections of varying lengths to permit use of a plurality of equal sized tubes;

An additional object is to provide an improved bump type filter having an adjustable movable anchor plate which applies tension in an extended state and relaxation in a slack state;

It is also an object of the present invention to utilize slack end filter tubes as extractor elements in a vacuum sludge receiver to improve filtering of liquid from the sludge.

These objects are achieved with a novel system and method utilizing slack end filtering tubes with tensioning means. An improved bump type filter employs a split inlet having an outlet and tube sheet at the lower slack end and a movable anchor plate at the upper end applying an adjustable tension to the filter tubes. The lower tube sheet is angled and is connected to a plurality of filters by nipples of varying length to permit filter tubes of equal size to be used. The anchor plate is movable up or down to extend or shrink the tube lengths to provide tension or relaxation of the tubes. Shaking of the tubes in the relaxed state removes accumulated materials to be flushed out.

A second embodiment of the slack end filtering tube with tensioning means is utilized in a vacuum sludge receiver as an extractor element to extract liquid from accumulated sludge. The filters are employed in a non-pressurized environment to permit filtering under atmospheric conditions with the vacuum being applied. This provides a differential which improves the flow through the filtering medium.

Other objects and advantages will become apparent from the following description taken in conjunction with the accompanying drawings.

BRIEF DESCRIPTION OF THE DRAWINGS

FIG. 2 is a schematic cross sectional side view of a vacuum sludge receiver employing slack end filter tubes as an extractor element;

FIG. 3 is an end view of the filter tube sheet of the vacuum sludge receiver; and FIG. 4 is a side view of a crank arm device used to move the anchor plate of the vacuum sludge receiver.

DESCRIPTION OF THE PREFERRED EMBODIMENTS

Figure 1:
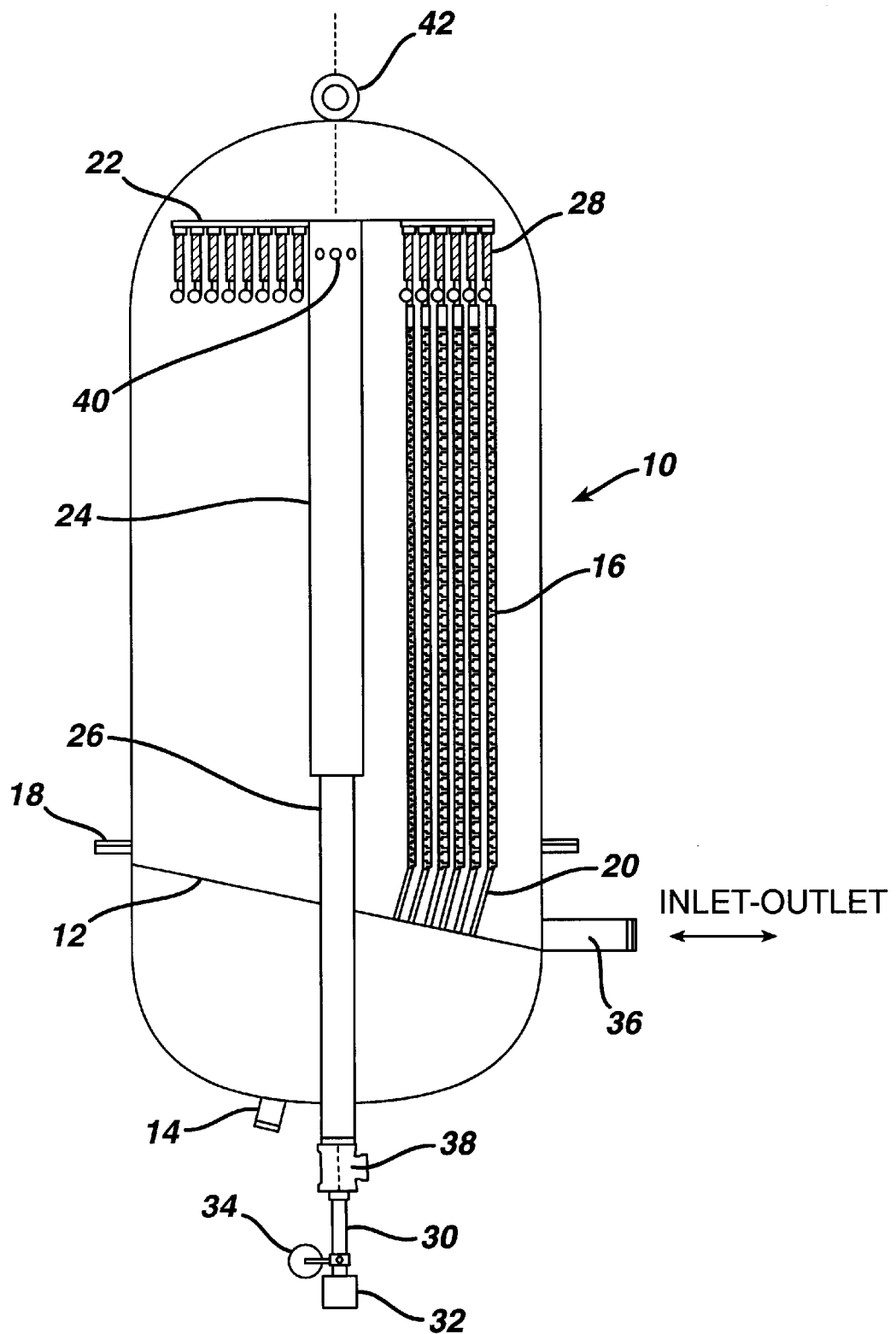
FIG. 1 is a schematic cross sectional side view of a bump type filter employing slack end filter tubes having a unique adjustable tensioning structure.

As shown in FIG. 1, a bump type filter 10 such as generally described in U.S. Pat. No. 4,872,981, is of a split inlet type of filter. The major difference of the present configuration is that the filter arrangement has the tube sheet 12 at the bottom instead of the top so that the outlet 14 from the filter tubes 16 is located in the bottom. The slack end type filter tubes 16 are connected to the tube sheet 12 which is disposed at an angle in the lower portion of the filter body.

The filter body is separable at a body flange 18, with the internal operation of the filter being generally described in the above noted patent of the split inlet filter type having oppositely disposed inlets.

The slack end filter tubes are connected to the angled or slanting tube sheet by means of nipples 20 of varying length that will enable tubes of equal size to be used. The slack end filter tubes have a slack end which is unsupported by, for example, inner supports of the tubes.

An anchor plate 22 to hold the end of the slack end filter remote from the outlet is mounted at the top of the outer riser pipe 24 to apply tension to the remote ends of the filter tubes. The anchor plate is capable of moving downward on the outer riser pipe in relation to the inner riser pipe 26, or the combination of the inner riser pipe and outer riser pipe movable in order to adjust the tension of the springs 28 connected to the ends of the tubes remote from the outlet, and thereby adjust the tension on these tubes to axially extend or shrink the length of the tubes so that the tubes will be under tension or in a relaxed state. In a relaxed state, the tubes can then be shaken easily in order to flush out any accumulations of material within the tubes and to rapidly clear the filter aid which is coating the external surface of the tube.

As shown at the bottom of FIG. 1, an anchor plate control shaft 30 is located above a lifting cylinder 32 and a bumping cylinder 34 to allow for actuation of the anchor plate. Lower pipe 36 provides the main inlet and outlet during different operating cycles, as further described in the noted patent, with an alternate inlet 38 also provided. Wash down outlets 40 and a lifting eye 42 are included.

In a second embodiment of the invention, a filter device using slack end filtering tubes with tensioning means includes provisions as set forth in U.S. Pat. No. 4,340,477, incorporated herein by reference.

This patent discloses a vacuum sludge receiver in which flexible filter tubes are used as an extractor element in order to extract liquid from accumulated sludge produced during the filtering cycle. Filter tubes are used which act in conjunction with filtering aids such as diatamaceous earth.

The present invention provides for a new type of filter device which incorporates the vacuum sludge receiver concept of extracting liquid from the sludge, and in addition, uses the slack end filters in a nonpressurized filtering environment to enable the filters to be run at atmospheric conditions with the vacuum being applied. This permits a differential to be provided which is necessary to produce flow through the filtering medium.

As shown in FIG. 2, a filter housing 44 resembling a trapezoidal cross section has a vertical end 46 and a pitched remote end 48.

Two sets of slack end filter tubes are provided. One set of tubes 50 is provided in a bottom arrangement, in which the tubes are held in a bottom pan 51. A second and larger group of filters are held in a cage 52 with a tube sheet 54 located near the vertical wall. The housing for the upper and lower tubes can be opened or closed. The housing has an inlet 56 and an outlet 58 for the bottom set of filter tubes, and an outlet 60 for the suction applied to the tube sheet outlet portion of the upper group of tubes. Cage 52, upper and lower support members and the anchor plate 61 hold the upper assembly of filter tubes. The slack end filters with tensioning means are ideally adapted for the arrangement set forth.

The entire filter housing can be filled with liquid by means of the bottom inlet 56, or liquid can be poured in at the opposite or the angled end of the housing. During normal operations, liquid enters in the bottom inlet and is drawn out through the filter suction outlet 60. If there is too much liquid to be filtered, an overflow outlet 62 is provided at the top and the excess liquid can be drawn off for recirculation.

When the filtering cycle is completed and it is time to recoat the filter tubes, the anchor plate 61 is moved and shaken by means of the crank arms 64 shown in FIG. 4. Movement of the anchor plate, shown in FIGS. 2 and 3, causes agitation of the slack end filter tubes to cause the filtering aid used to coat the filter to fall to the bottom of the container.

During the coating cycle, new filtering material can be added and liquid can be injected into the system through the bottom inlet 56 to cause the coating cycle to start in much the same manner as a standard precoat filter.

After the filtering cycle is completed and it is desired to remove the sludge and the exhausted filtering aid, the filter suction is maintained and liquid will be drawn from and through the upper group of filtering tubes until the sludge and used filtering aid is removed from the filter.

When it is desired to end the filtering cycle and remove the sludge that has accumulated during the filtering process, the filtering will continue by removal of the liquid from the filter suction outlet. As the level drops, the liquid will drop below the level of the upper grouping of filtering tubes and a vacuum suction can be applied through an outlet in order to pass air through these filtering tubes to help dry the filtering aid which is caked on the outside of the tube. Once the liquid falls below the level of the filter suction outlet, then the sludge suction outlet 58 at the very lowest portion of the housing of the container is actuated and the liquid remaining in the residue is extracted from the sludge suction filter tubes in the same manner as the vacuum sludge receiver shown in the related patent. A cover may be placed over the housing 44 to recirculate air when required.

The second or lower sludge section of filter tubes can be free and unrestrained as shown in the related patent, or they can be the slack end filter tubes with tensioning means as shown for the upper group of filtering tubes. When the liquid has been fully extracted from the sludge, the entire apparatus can then be lifted by means of forklift sockets 66 and the container can be pivoted on the trunnions 68 to which it is mounted for it to be rotated so that the sludge which will then be on the bottom of the container can be slid along the angle portion of the container to any convenient receptacle.

This is especially useful for applications in which toxic wastes may be handled or where the sludge requires special handling.

While only a limited number of embodiments have been illustrated and described, other variations may be made in the particular configuration without departing from the scope of the invention as set forth in the appended claims.

What is claimed is:

1. A filter device, comprising:
an enclosure;
a tube sheet in said enclosure for dividing said enclosure into filtered and unfiltered chambers, said tube sheet having openings therethrough;
an anchor plate spaced from said tube sheet and in the unfiltered chamber;
a plurality of external resilient tensioning means having a first end and a second end, each of said first ends connected to said anchor plate;
a plurality of elongated flexible filter tubes each having a flexible permeable tubular filter wall and, each having a closed end and an open end, each of said closed ends connected to the second end of one of said resilient means, the open end of each of said filter tubes being connected to respective tube sheet openings, said filter tubes adapted to have coatings thereon for filtering liquid flow therethrough;
resilient inner tubular support means within each of said filter tubes, the length when relaxed of said tubular support means being less than the length of said tubular filter wall;
each of said external resilient tensioning means tensioning the resilient inner tubular support means within each of said filter tubes to stretch the resilient inner tubular support means and the permeable tubular filter wall to bring the tubular filter wall into supportive contact with the resilient inner tubular support means;
inlet means for supplying liquid to be filtered into said unfiltered chamber;
outlet means for removing filtered liquid from said filter chamber; and
agitating means connected to said anchor plate to move said anchor plate to vary the tension of said external resilient tensioning means to adjust the stretch of said inner tubular support means to have said inner tubular support means contact said filter tubes in a first position to filter a liquid, and to release said tension and reduce said stretch in said filter tubes in a second position for removal of materials accumulated on said filter tubes.

2. A filter device comprising:
an enclosure adapted for being mounted horizontally at a vertical wall of said enclosure;
a tube sheet near said vertical wall of said enclosure, the tube sheet having openings therethrough and dividing said enclosure into filtered and unfiltered chambers;
an anchor plate in said enclosure, said anchor plate spaced apart from said tube sheet;
a plurality of resilient means connected at a first resilient end to said anchor plate;
a plurality of laterally extending elongated flexible permeable filter tubes within said enclosure connected at a first flexible end to a second resilient end of each of said resilient means, a second flexible end of each of said filter tubes being connected to respective tube sheet openings, said filter tubes adapted to have coatings thereon for filtering liquid flow therethrough;
inner tubular support means within each of said filter tubes, said support means connected to said resilient means, said tubular support means having a length which is substantially shorter than a length of said sheet when said sheet is in an axially extended condition;
inlet means for supplying liquid to be filtered into said unfiltered chamber;
outlet means for removing filtered liquid from said filter chamber; and
agitating means connected to said anchor plate for moving said plurality of resilient means to tension and stretch said tubular support means against said filter tubes in a first position for filtering, and release said tension to relax said filter tubes in a second position, movement of said anchor plate between said first and second positions causing removal of materials accumulated on said filter tubes.

3. A filter device comprising:
an enclosure,
a tube sheet positioned at an angle at a first portion of said enclosure and dividing said enclosure into filtered and unfiltered chambers, said tube sheet having openings therethrough and a plurality of nipples of varying lengths at the tube sheet openings;
an anchor plate at a second portion of said enclosure in the unfiltered chamber;
a plurality of resilient means connected at a first resilient end to said anchor plate;
a plurality of elongated flexible permeable filter tubes being of equal lengths connected at a first flexible end to a second resilient end of said resilient means, a second flexible end of each of said filter tubes being connected to one of the plurality of resilient nipples for connection to respective tube sheet openings,
said filter tubes adapted to have coatings thereon for filtering liquid flow therethrough;
resilient inner tubular support means within each of said filter tubes, each of said filter tubes being unsupported by said inner support means when said support means are in a relaxed state;
inlet means for supplying liquid to be filtered into said unfiltered chamber;
outlet means for removing filtered liquid from said filtered chamber;
movable support means having a first support end connected to said anchor plate and extending along said enclosure, a second support end of said movable support means passing through said tube sheet and out of said first portion of said enclosure; and
agitating means connected to said second support end of said movable support means for moving said anchor plate to apply an adjustable tension and stretch said filter tubes in a first position for filtration, and release said tension to relax said filter tubes in a second position, movement of said anchor plate causing removal of materials accumulated on said filter tubes.

4. The filter device of claim 1 wherein said movable support means includes a centrally positioned outer riser pipe engaging a centrally positioned inner riser pipe, said agitating means moving said outer riser pipe along said inner riser pipe to move said anchor plate and apply said adjustable tension to said plurality of resilient means connected to said anchor plate.

5. The filter device of claim 4 wherein said filter device is a split inlet type filter device having said tube sheet and outlet means at the first portion of said enclosure, and said anchor plate at the second portion of said enclosure.

6. The filter device of claim 5 wherein said enclosure includes a separable flange at the first portion, said first portion being separable from said enclosure for removal of accumulated materials.

7. The filter device of claim 6 wherein said inner riser pipe extends out of said first portion of said enclosure, and includes an external anchor plate control shaft connected to a lower end of said inner riser pipe, and a lifting cylinder and a bumping cylinder connected to said control shaft for moving said anchor plate.

8. A filter device comprising:
an enclosure adapted for being mounted horizontally at a vertical wall of said enclosure;
a tube sheet near said vertical wall of said enclosure, the tube sheet having openings therethrough and dividing said enclosure into filtered and unfiltered chambers;
an anchor plate in said enclosure and spaced apart from said tube sheet;
a plurality of resilient means connected at a first resilient end to said anchor plate;
a plurality of laterally extending elongated flexible permeable filter tubes within said enclosure connected at a first flexible end to a second resilient end of said resilient means, a second flexible end of each said filter tubes being connected to respective tube sheet openings, said filter tubes adapted to have coatings thereon for filtering liquid flow therethrough;
inner tubular support means within each of said filter tubes, said support means connected to said resilient means;
inlet means for supplying liquid to be filtered into said unfiltered chamber;
outlet means for removing filtered liquid from said filtered chamber; and
agitating means connected to said anchor plate for moving said plurality of resilient means to tension and stretch said tubular support means against said filter tubes in a first position for filtering, and release said tension to relax said filter tubes in a second position, movement of said anchor plate between said first and second positions causing removal of materials accumulated on said filter tubes.

9. The filter device of claim 8, wherein said device is a vacuum sludge receiver and said enclosure is a first filter device enclosure being mounted along an upper portion of said vertical wall of said vacuum sludge receiver and extending laterally therefrom, including in combination,
a second filter device enclosure extending laterally from said vertical wall along a bottom of said vacuum sludge receiver,
liquid inlet and outlet openings in the bottom of said vertical wall, and
a suction outlet in the vertical wall for applying suction to said first filter device enclosure.

10. The filter device of claim 9 wherein said first filter device enclosure includes a cage having upper and lower support members and an overflow outlet in said upper wall portion.

11. The filter device of claim 10 including a crank arm for moving said anchor plate.

12. The filter device of claim 9, wherein said vacuum sludge receiver is a trapezoidal shaped housing having said vertical wall at one side of said housing, and a pitched remote end wall spaced apart from said vertical wall, said housing being mounted on forklift sockets and pivotable trunnions for tilting said sludge receiver to remove accumulated sludge.

13. A filter device comprising:
a vacuum sludge receiver having a trapezoidal shaped housing with a vertical wall at one side of the housing, and a pitched remote end wall spaced apart from said vertical wall;
a first filter enclosure mounted along an upper portion of said vertical wall and extending laterally therefrom;
a permeable tube sheet with openings therein arranged near said vertical wall;
an anchor plate in said enclosure spaced apart from said tube sheet;
a plurality of elongated flexible permeable filter tubes extending laterally within said enclosure, each of said filter tubes having a slack permeable tubular filter wall connected to said openings in said tube sheet;
resilient inner support means within each respective filter tube;
a plurality of resilient means connecting respective other ends of said filter tubes to said anchor plate, said filter tubes adapted to have coatings thereon for filtering liquid flow therethrough;
a cage having upper and lower support members connected to said tube sheet and vertical wall at one ends and to said anchor plate at the other end for laterally supporting said filter tubes in said enclosure;
means attachable to said anchor plate for tensioning said resilient inner support means to contact said plurality of filter tubes for filtering liquid, and to relax said inner support means to remove accumulated materials therefrom;
a second filter enclosure extending laterally from said wall along the bottom of said vacuum sludge receiver;
liquid inlet and outlet openings in the bottom of said wall;
a suction outlet in the upper wall for applying suction to said first filter enclosure; and
an overflow outlet in said upper wall portion.

14. The filter device of claim 13 wherein said vacuum sludge receiver includes forklift sockets and pivotable trunnions for tilting said receiver to remove accumulated sludge.

15. A method for filtering liquids comprising:
mounting a plurality of elongated permeable flexible filter tubes within an enclosure between a movable anchor plate at a first end of said enclosure, and a tube sheet having openings at a second end of said enclosure spaced apart from said first end, said filter tubes having resilient inner tubular support means and being slack about said support means when said support means are in a relaxed state,
moving said movable anchor plate to tension the support means and bring the filter tubes into contact with said support means,
applying a coating to said tensioned filter tubes for filtering liquids passing through said tensioned tubes,
passing liquid for being filtered into said enclosure through said tensioned filter tubes,
extracting filtered liquid from said tensioned tubes, and removing filtered liquid from said enclosure,
agitating said movable anchor plate to relax said filter tubes to cause removal of materials collected on said filter tubes, and
removing the materials collected from said enclosure.

16. The method of claim 15 including:
mounting said filter tubes vertically within a longitudinally extending enclosure, and
moving and agitating said movable anchor plate to longitudinally stretch and relax said filter tubes.

17. The method of claim 15 including:
mounting said filter tubes horizontally within a first laterally extending enclosure, and moving and agitating said movable anchor plate to laterally stretch and relax said filter tubes.

18. The method of claim 17 including:

mounting said enclosure to extend laterally from an upper section of a vertical wall of a filtered liquid sludge receiver;

mounting a second enclosure having a second plurality of said filter tubes extending laterally from a lower section of said vertical wall along a bottom of said sludge receiver;

draining extracted filtered liquid from the upper section of said sludge receiver; and extracting remaining filtered liquid from the bottom of said sludge receiver.

* * * * *